United States Patent Office 2,716,600
Patented Aug. 30, 1955

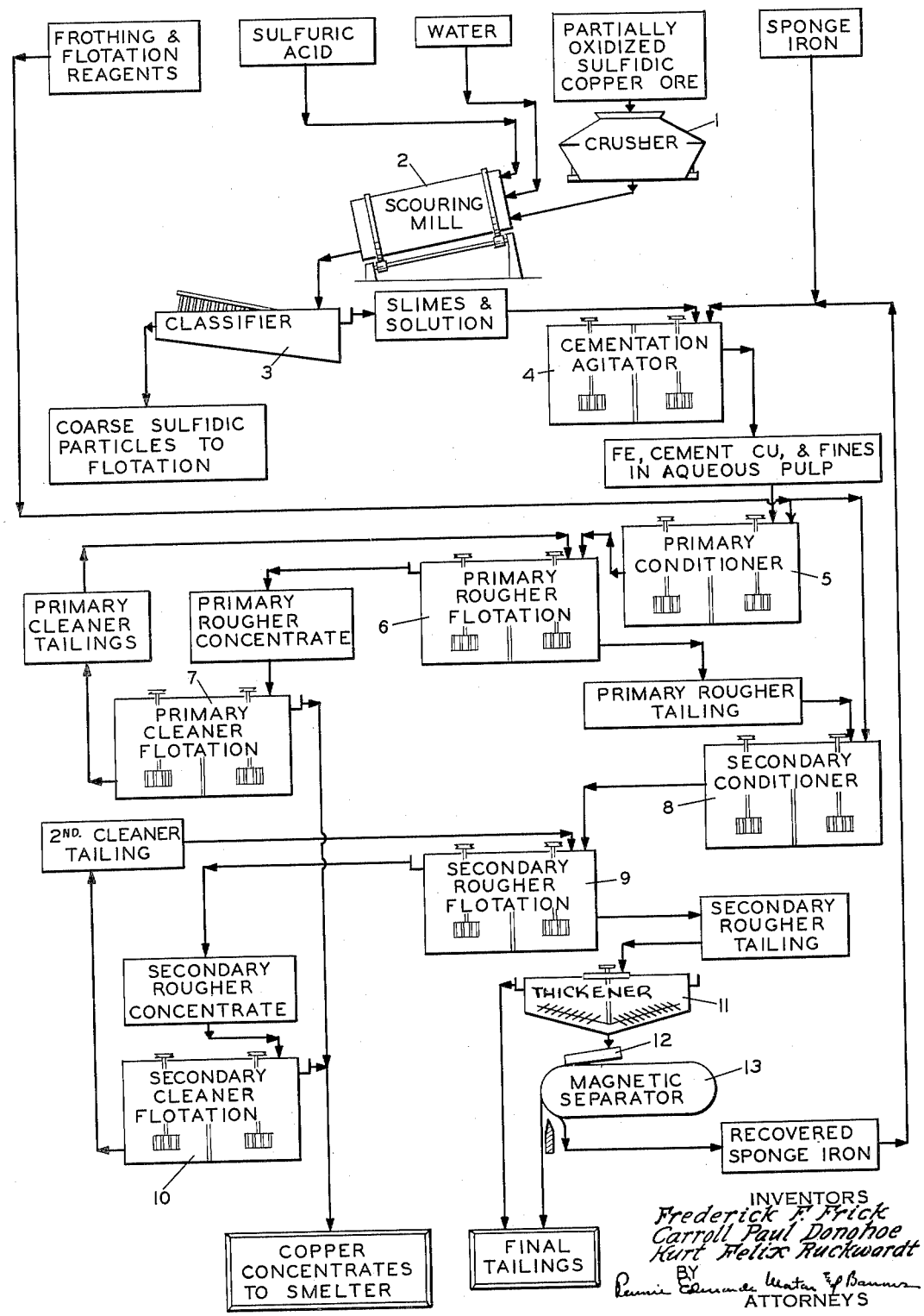

2,716,600

METHOD OF RECOVERING COPPER FROM SULFIDIC COPPER ORE

Frederick F. Frick, Anaconda, Mont., Carroll Paul Donohoe, Naco, Ariz., and Kurt Felix Ruckwardt, Anaconda, Mont., assignors to Anaconda Copper Mining Company, New York, N. Y., a corporation of Montana Application August 29, 1950, Serial No. 181,964

2 Claims. (Cl. 75—2)

This invention relates to the recovery of copper from its ores, and is particularly directed to the provision of an improved process for recovering copper from a superficially oxidized slime-producing sulfidic copper ore. It is a particular object of the invention to effect separation of acid-soluble oxidized constituents and sulfidic slime constituents of the ore from the coarse sulfidic ore particles, and to prepare a concentrate suitable for smelting containing the copper of the oxidized and slime constituents.

When sulfidic copper ore has been exposed for a sufficient period of time to ground waters and to the air, it is in part converted to oxidized copper compounds such as cuprous and cupric oxide, basic copper carbonate, copper sulfate, etc. The effect of such exposure on a coarsely broken sulfidic copper ore body is to convert the surface portions of the core particles to oxidized copper compounds before the cores of such particles are altered from their original sulfidic form. Substantial quantities of such superficially oxidized sulfidic copper ores are available. Sometimes they may occur solely as the result of natural processes. In other instances they have been formed by oxidation of low-grade sulfidic ore bodies that were opened by early mining operations to exposure to the air and to oxidizing ground waters. However they may have been formed, the recovery of their copper content poses a special problem, because the oxidized constituents of the ore are not amenable to the same type of treatment for copper recovery as are the sulfidic constituents of the ore, and vice versa. If in addition the ore is of slime-producing character, the problem of securing a high recovery of its copper content is even more difficult.

The present invention provides a simple and effective procedure for obtaining a high recovery of copper from ores of the character just described. In accordance with the invention, the ore, after first being coarsely crushed (to about one- to two-inch size) is scoured by simply tumbling it in the presence of dilute aqueous sulfuric acid. The volume of such acid used is advantageously limited so as to yield with the slimes present a pulp containing at least about 15% by weight of solids, and the acid concentration advantageously is such as to form a pulp in which the pH of the aqueous phase is about 2. This operation results in dissolving the soluble oxidized constituents of the ore in the dilute acid and at the same time in scouring the slimes from the coarse sulfidic ore particles. The scoured coarse ore particles are then separated from the residual pulp of slimes suspended in the copper-bearing solution, and they may thereafter be treated for the recovery of their copper content by conventional sulfide concentrating and smelting procedures.

The pulp, composed essentially of insoluble sulfidic slimes suspended in an acid aqueous solution of the oxidized components of the ore, is treated with metallic iron, preferably in granular form, in an amount in excess of that required to precipitate the dissolved copper as metallic cement copper. The resulting pulp of sulfidic slimes, cement copper, and excess of metallic iron suspended in an acid aqueous medium, is subjected to a froth flotation operation in the presence of conventional flotation and frothing reagents to produce a concentrate suitable for smelting which contains both the sulfide copper slimes and the precipitated metallic cement copper. The presence of the metallic iron in the pulp during the flotation operation serves to minimize loss of the cement copper by re-solution during progress of the flotation operation. The concentrate is treated by conventional smelting procedures. The tailing from the flotation operation, which contains the residual unconsumed metallic iron which was added to the pulp from the scouring operation, is advantageously treated to recover such iron, which is then reused in the process for the treatment of a further quantity of pulp.

A presently preferred embodiment of the invention is particularly described below with reference to the accompanying flow sheet:

A slime-producing sulfidic copper ore, which has been partially and superficially oxidized, is first passed through a coarse crusher 1 to reduce it to particles not larger than say 1¾ inch maximum dimension.

The crushed ore passes to a scouring mill 2 in which it is scoured by tumbling in the presence of a limited amount of aqueous sulfuric acid having a pH of about 2. The scouring mill consists essentially of a rotatable drum of wood or steel which is formed with an ore inlet opening at one end and an ore discharge opening at the other end. It may be inclined somewhat to the horizontal, so that as it rotates the ore charged into it is caused to move gradually to the discharge end. The dilute acid employed in the scouring operation may be added as such to the ore in the mill, or the water and concentrated sulfuric acid may be added separately in the proper proportions to yield a solution of desired acid concentration. In either event it is delivered to the scouring mill at its charging end along with the incoming ore.

The scouring mill is not to be confused with a ball or rod grinding mill, for it contains no rods or balls for grinding purposes and in fact is not intended to effect any grinding of the ore. It serves simply to tumble the coarsely crushed ore particles over and over against themselves and against the confining walls of the mill, so as to insure scouring all slimes and other loosely adhering material away from the coarse sulfidic ore particles. At the same time, the jarring impact of the ore particles against one another and the agitation of the ore which takes place in the scouring mill insures substantially complete removal from the ore particles, and the dissolving of all of the water-soluble and acid-soluble oxidized constitutents thereof in the added dilute acid.

It is particularly desirable to limit the volume of dilute acid introduced with the ore into the scouring mill so as to form with the ore slimes a pulp containing at least about 15% by weight of solids. Such an amount of acid is adequate for insuring complete dissolving of the oxidized constituents of the ore, and yields a pulp of sufficiently high density so that it need not be thickened preparatory to the flotation step which is subsequently performed. If a substantially larger volume of acid is used, a relatively poor recovery of copper from the slimes and oxidized ore components will result, or added steps which complicate the process as a whole will be required, or both.

The discharge from the scouring mill 2 passes to a rake classifier 3 of conventional design. Here the scoured coarse sulfidic ore particles are separated from the residual pulp of sulfidic slimes suspended in the acid copper-bearing solution. If desired, the separated coarse sulfide particles may be washed with a limited amount of water to remove adhering slimes and solution, and the washings may be added to the pulp in, or delivered from, the classifier. The separated coarse sulfidic ore particles are sent to a conventional flotation mill for concentration preparatory to smelting in the usual manner.

The pulp of sulfidic slimes suspended in the acid copper-bearing solution that is separated from the coarse ore particles in the classifier 3 is delivered to a cementation agitator 4. Conventional mechanically agitated flotation cells are well suited to serve as the agitator. As the pulp is delivered to the agitator, it is mixed with metallic iron in a granular state of subdivision. Sponge iron is a particularly convenient form of metallic iron to use for this purpose. The pulp is thoroughly churned with the added iron in the cementation agitator, with the result that the dissolved copper is precipitated as cement copper. The cement copper, which is the copper that was originally present in the oxidized constituents of the ore, remains in suspension in the pulp. The amount of sponge iron added to the pulp in the cementation agitator is substantially in excess of the amount required to precipitate by cementation all of the copper dissolved in the aqueous phase of the pulp. In consequence, the discharge from the agitator is a pulp composed essentially of the excess of added sponge iron, the precipitated cement copper, and the insoluble sulfidic slimes, all suspended in an acidic aqueous medium.

The discharge from the cementation agitator 4 is passed to a primary conditioner 5 in which conventional frothing and flotation reagents, e. g. pine oil and dixanthogen ("Minerec"), are incorporated in it. One or more mechanically agitated flotation cells serve very well as the conditioner.

The conditioned pulp flows to a series of aerated primary rougher flotation cells 6, in which it is subjected to a conventional rougher froth flotation operation resulting in the production of a primary rougher tailing and a primary rougher concentrate. This concentrate is delivered to a series of primary cleaner flotation cells 7, wherein it is subjected to a cleaner flotation operation resulting in the production of a cleaner copper concentrate and a primary cleaner tailing. This tailing is returned in the usual manner to the primary rougher flotation operation.

It is often advantageous to subject the rougher tailing from the primary flotation circuit to a secondary flotation operation to insure a high recovery of copper. For this purpose, as shown on the accompanying flow sheet, the primary rougher tailing pulp is delivered to a secondary conditioner 8 (similar to the primary conditioner 5) wherein a further quantity of frothing and flotation reagents are incorporated in it. The conditioned pulp thence passes to a series of secondary rougher flotation cells 9 in which it is subjected to a secondary rougher froth flotation operation which results in the production of a secondary (and final) rougher tailing from which practically all of the copper has been separated, and a secondary rougher concentrate. This concentrate is subjected to a secondary cleaner flotation operation in a series of secondary cleaner flotation cells 10 wherein a further quantity of cleaner copper concentrate is produced. The tailing from the secondary cleaner flotation operation is recycled to the secondary rougher flotation operation.

In the course of the primary and secondary flotation operations, the sulfide slimes and the cement copper are both finally recovered in the cleaner concentrates. The excess of metallic iron is not floated, however, and ultimately it finds its way into the secondary (final) rougher tailings. However, its presence in the pulp throughout the flotation operations minimizes any loss of the metallic cement copper by way of re-solution. The flotation operation is carried out with the pulp in the acid condition (at a pH of, say, about 3.5) and of course the pulp is vigorously aerated during flotation. Thus conditions prevalent during flotation favor re-dissolving some of the finely divided cement copper. The iron present in the flotation pulp insures re-precipitation, as cement copper, of any such copper that is re-dissolved, and consequently its presence insures a high ultimate recovery of the cement copper in the cleaner flotation concentrates. Although little or no metallic iron passes with the rougher concentrates to the cleaner flotation cells, the bulk of any cement copper that re-dissolves in the cleaner cells is returned with the cleaner tailings to the rougher cells, and there is re-precipitated by the excess of metallic iron that is present.

The cleaner copper concentrates, composed of sulfide copper slimes and cement copper, are suitable for smelting in a conventional reverberatory furnace, and their copper content advantageously is recovered by such procedure.

The tailings discharged from the secondary rougher flotation cells 9 are delivered to a thickener or hydroseparator 11. These tailings are composed essentially of an aqueous suspension of gangue slime and unconsumed excess of sponge iron. The unconsumed iron settles to the bottom of the thickener and is discharged in the spigot product to a short launder 12 by which it is caused to flow over a magnetic separator 13. Here the sponge iron is separately collected from the non-metallic gangue and from the aqueous phase of the pulp. The sponge iron thus recovered is returned to the cementation agitator for reuse in treating a further quantity of incoming pulp; and of course any cement copper still adhering to such iron is thereby returned to the process so that ultimately it is recovered.

The non-magnetic constituents of the spigot product from the thickener are discharged to waste. The thickener overflow likewise may be discharged to waste; though in arid regions where water is at a premium, and where it is sufficiently free of residual flotation and frothing agents, it may in whole or in part be recycled for reuse in the scouring mill.

We claim:

1. The method of recovering copper from a superficially oxidized slime-producing sulfidic copper ore which comprises providing in a container in the presence of dilute sufuric acid a body of the ore in a coarsely crushed condition, raising particles from said body and causing them to tumble back onto other particles of the body with a jarring impact, whereby acid-soluble oxidized constituents of the ore are dissolved and sulfidic ore slimes are scoured from the coarse sulfidic ore particles, separating the scoured coarse particles from the residual pulp of slimes suspended in acid copper-bearing solution, treating said pulp with granular metallic iron in an amount substantially in excess of that required to precipitate the dissolved copper as metallic cement copper, subjecting the resulting acidic pulp of sulfidic copper ore slimes and cement copper to froth flotation in an acid circuit and in the presence of said excess of metallic iron, separately recovering a copper concentrate suitable for smelting and a tailing containing unconsumed metallic iron from said flotation operation, separating the metallic iron from said tailing, and using the separated metallic iron in the treatment of a further quantity of pulp to precipitate dissolved copper therefrom.

2. In a process of the character described, in which a pulp of sulfidic copper ore slimes in an acidic aqueous medium containing dissolved copper is treated with metallic iron to precipitate the dissolved copper as metallic cement copper, and in which the acidic pulp is thereafter subjected to froth flotation in an acid circuit to produce a concentrate of sulfide copper and cement copper suitable for smelting, the improvement which comprises treating said acidic pulp with an amount of granular metallic iron substantially in excess of that required to precipitate the dissolved copper, retaining such excess of metallic iron suspended in the acidic pulp during the subsequent flotation operation, whereby loss of metallic copper by re-solution during progress of the flotation operation is minimized, recovering a tailing containing unconsumed metallic iron from the flotation operation, separating the metallic iron from said tailing, and employing such separated metallic iron in the precipitation treatment of a further quantity of said pulp.

References Cited in the file of this patent

UNITED STATES PATENTS

| Number | Name | Date |
|---|---|---|
| 1,217,437 | Gahl | Feb. 27, 1917 |
| 1,268,940 | Dosenbach | June 11, 1918 |
| 1,518,828 | Thornhill et al. | Dec. 9, 1924 |
| 1,523,444 | Nevill et al. | Jan. 20, 1925 |
| 1,589,615 | Terry | June 22, 1926 |
| 1,820,172 | Ayer et al. | Aug. 25, 1931 |
| 1,848,396 | Stevens | Mar. 8, 1932 |
| 2,130,278 | Keyes | Sept. 13, 1938 |